United States Patent [19]

Esler et al.

[11] Patent Number: 4,706,984

[45] Date of Patent: Nov. 17, 1987

[54] STABILIZER DEVICE FOR TRAILER

[76] Inventors: Kenneth G. G. Esler; John A. Esler, both of c/o P.O. Box 879, Biggar, Saskatchewan, Canada, S0K 0M0

[21] Appl. No.: 945,627

[22] Filed: Dec. 23, 1986

[51] Int. Cl.⁴ .............................................. B60D 1/00
[52] U.S. Cl. ................................... 280/432; 280/446 B
[58] Field of Search ............... 280/432, 446 B, 446 R, 280/433; 180/141, 143

[56] References Cited

U.S. PATENT DOCUMENTS

| | | | |
|---|---|---|---|
| 2,465,285 | 8/1951 | Wakeman | 280/432 |
| 3,502,350 | 3/1970 | Pearson | 280/432 |
| 4,133,552 | 1/1979 | Sheine | 280/446 B |

Primary Examiner—John J. Love
Assistant Examiner—Donn McGiehan
Attorney, Agent, or Firm—George H. Dunsmuir

[57] ABSTRACT

A stabilizer device for use on the leading end of a trailer includes a turntable with a fixed base, pivot plate rotatably mounted on the base, a pair of hydraulic cylinders pivotally connected to each other and to one side of the pivot plate at one end, piston rods extending outwardly from the other ends of the cylinders to opposite sides of the turntable, the outer ends of the piston rods being pivotally connected to a fixed portion of the trailer, a first tube extending between first ends of the cylinders, a second tube extending between the other ends of the cylinders so that the cylinders and tubes form a closed circuit, and a control system in one of the tubes. The control system includes a pair of lines inserted into the tube, a first fixed orifice element in one of the lines, a solenoid valve in the same one line, a speed monitor attached to the valve, and a second smaller fixed orifice element in the other line. With the solenoid valve open, hydraulic liquid normally flows relatively freely through the larger fixed orifice and the solenoid valve. If the travel speed of the trailer increases beyond a predetermined level, the monitor closes the solenoid valve, so that the hydraulic liquid must flow through the smaller fixed orifice which results in resistance to such turning movement.

4 Claims, 2 Drawing Figures

FRONT END OF TRAILER

STABILIZER DEVICE FOR TRAILER

BACKGROUND OF THE INVENTION

This invention relates to a stabilizing device for a trailer, and in particular to a device for preventing sway between a trailer and a towing vehicle.

Pronounced sway between a trailer and a towing vehicle represents a serious problem, including as one extreme what is commonly referred to as fishtailing. Attempts have been made to control the swaying between a trailer and a towing vehicle.

Examples of antisway devices are found in Canadian Pat. Nos. 482,291, issued to Clifford M. Wakeman on Apr. 8, 1952; 1,055,971, issued to Dala W. Schubert et al on June 5, 1979 and 1,164,497, issued to Durrel U. Howard on Mar. 27, 1984. In general, the patented devices are somewhat complicated and/or incapable of control in response to predetermined trailer speed changes.

The object of the present invention is to overcome the above-identified problems by providing a relatively simple stabilizing device for use between a towed vehicle and a towing vehicle, which is capable of controlling sway when the speed of the towed vehicle exceeds a predetermined maximum.

SUMMARY OF THE INVENTION

Accordingly, the present invention relates to a stabilizing device for use on a towed vehicle comprising turntable means for mounting on the leading end of the towed vehicle; first hydraulic cylinder means pivotally connected at one end to a rotatable portion of the turntable means near one end of the rotatable portion; first piston rod means extending out of the other end of said first cylinder means and pivotally connected to a fixed portion of the towed vehicle on one side of the rotatable portion; second hydraulic cylinder means pivotally connected at one end to the rotatable portion of the turntable means at or near said one end of the other end of said second cylinder means; second piston rod means extending out of the other end of said second cylinder means and pivotally connected to a fixed portion of the towed vehicle on a second side of the rotatable portion opposite to said one side thereof; first tube means interconnecting one end of said first and second hydraulic cylinder means; second tube means interconnecting the other end of said first and second hydraulic cylinder means; control means in one said tube means, including a pair of lines for carrying hydraulic liquid between ends of the tube means containing the control means; valve means in one said line for closing said one line; sensor means for sensing the speed of the towed vehicle and for closing said valve means when the speed of the towed vehicle exceeds a predetermined maximum; and first fixed orifice means in the other said line of smaller area than said one line for carrying hydraulic fluid when said valve means is closed, whereby hydraulic fluid normally flows freely between said cylinders to permit free rotation of said rotatable portion of the turntable means, and at trailer travel speeds exceeding the predetermined maximum, the valve means closes said one line, to cause hydraulic liquid to flow through said first restricted orifice means to inhibit turning of said rotatable portion, and consequently of said towed vehicle.

BRIEF DESCRIPTION OF THE DRAWINGS

The invention will now be described in greater detail with reference to the accompanying drawing, which illustrates a preferred embodiment of the invention, and wherein.

DESCRIPTION OF THE PREFERRED EMBODIMENT

Figure 1:
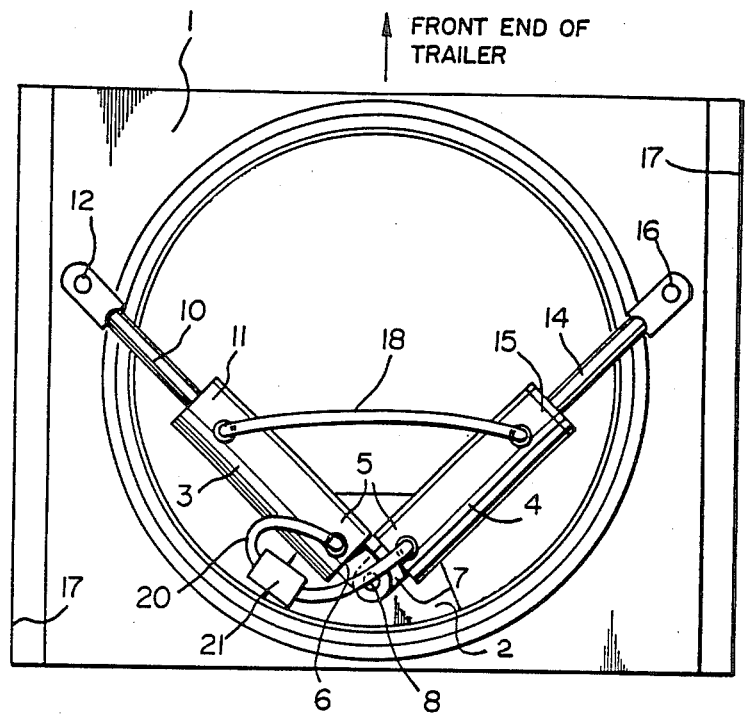
FIG. 1 is a schematic, plan view of a stabilizing device in accordance with the present invention.

With reference to the drawing, the device of the present invention includes a turntable for mounting on the leading end of a trailer (not shown). The turntable includes a base plate 1 for fixedly mounting on the trailer, and a circular pivot plate 2 rotatably mounted on such base plate 1. A pair of hydraulic cylinders 3 and 4 are mounted on the pivot plate 2. The ends 5 of the cylinders 3 and 4 are pivotally connected to each other and to the pivot plate 2 near the rear edge thereof by a clevis 6 on one cylinder 3, a lug 7 on the other cylinder 4 and a pin 8. A piston rod 10 extends outwardly from the other end 11 of the cylinder 3. The outer end of the piston rod 10 is pivotally connected to one side of the base plate 1 by a pin 12. A piston rod 14 extends out of the other end 15 of the cylinder 4. The outer end of the piston rod 14 is pivotally connected to the base plate 1 on the other side of the pivot plate 2 opposite the pin 12, i.e. opposite to the point of connection of the outer end of the piston rod 10 by a pin 16. The sides 17 of the base plate 1 are parallel to the sides of the trailer.

A first length of tubing 18 connects the outer end 11 of the cylinder 3 to the outer end 15 of the cylinder 4. A second length of tubing 20 is used to connect the ends 5 of the cylinders 3 and 4 to each other. Thus, the cylinders 3 and 4 form a closed system with fluid flow between the ends thereof. Turning of the trailer in either direction results in extension of one piston rod 10 or 14 and retraction of the other piston rod 14 or 10, respectively.

Figure 2:
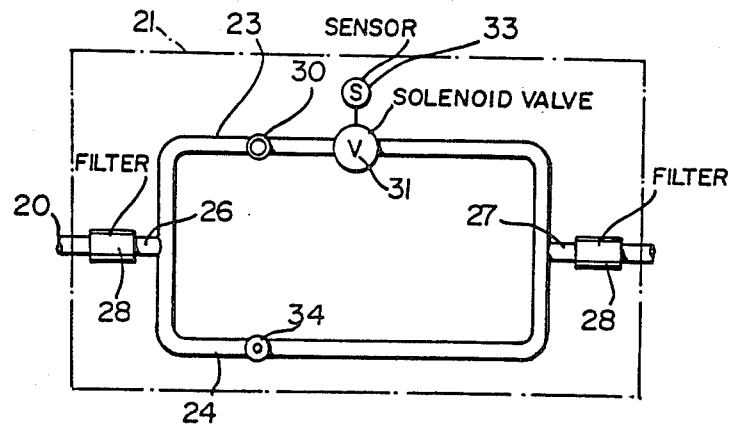
FIG. 2 is a schematic block diagram of a control assembly for use in the device of FIG. 1.

The flow of hydraulic fluid between the cylinders 3 and 4, and consequently control of turning of the trailer is effected using a control box 21 (FIG. 2). The control box 21 contains a pair of parallel lines defined by tubes 23 and 24 which extend between opposed ends 26 and 27 of the tube 20. A filter 28 is provided in each of the opposed ends 26 and 27 of the tube 20. A fixed orifice element 30 is provided in the tube 23. A solenoid valve 31 is also provided in such tube 23. The valve 31 is controlled by a speed monitor or sensor 33. The sensor 33 is used to determine the speed of the trailer and, when such speed exceeds a predetermined maximum, to close the valve 31. A fixed orifice element 34 is also provided in the tube 24. The orifice element 34 is substantially smaller than the fixed orifice element 30.

In operation, hydraulic liquid normally flows freely between the cylinders 3 and 4. Since the liquid follows the path of least resistance, with the valve 31 open, the liquid will flow through the line 23, the orifice element 30 and the valve 31 between the opposed ends 26 and 27 of the tube 20. If the travel speed of the trailer exceeds a predetermined maximum, the sensor 33 causes the valve 31 to close, and consequently the liquid is forced to flow through the restricted orifice element 34. The smaller orifice element 34 reduces the speed of flow of the hydraulic liquid between the cylinders 3 and 4, and cnsequently increases resistance to turntable movement, since the piston rods 10 and 14 cannot move as freely or quickly into or out of the cylinders 3 and 4.

At any speed, the control will resist sudden fluid flow and thus the cylinders 3 and 4 perform as shock absorbers, resisting sudden side-to-side movements of the trailer. The strokes of the piston rods 10 and 14 restrict the turning angle of the front axle of the trailer. When either of the piston rods 10 or 14 is completely retracted in the cylinder 3 or 4, respectively, the piston rod acts as a stop against further turning of the front trailer axle.

A specific example of the operation follows. At speeds below 30-35 mph, the speed monitor or sensor 33 maintains the solenoid valve 31 in the open condition. The hydraulic liquid follows the path of least resistance, flowing through the orifice element 30 and the solenoid valve 31. Such flow is relatively unrestricted, and the turntable 2 turns relatively freely at lower speeds. If the speed exceeds the predetermined limit of 30-35 mph, the sensor 33 closes the valve 31 which shuts off the path of least resistance through the control box 21. The fluid must pass through the restricted orifice element 34, which increases the resistance to rotation of the turntable 2.

It will be appreciated that in the simplest form of the invention, the fixed orifice element 30 is not required. The interior surface of the line 23 performs the function of the larger fixed orifice element and, during normal operation, hydraulic liquid will flow through such line 23. Moreover, by making the orifice elements 30 and 34 replaceable with elements of different areas, the degree of control can be varied. For example, if the smaller orifice element 34 is made even smaller, the resistance to turning or sway will increase.

Thus, there has been described a relatively simple trailer stabilizer, which increases the safety of a trailer at highway speeds, while permitting easy turning at slow speeds. Moreover, and perhaps most importantly, the device prevents sudden, violent movement of the trailer such as encountered in a fishtail situation.

What is claimed is:

1. A stabilizing device for use on a towed vehicle comprising turntable means for mounting on the leading end of the towed vehicle; first hydraulic cylinder means pivotally connected at one end to a rotatable portion of the turntable means near one end of the rotatable portion; first piston rod means extending out of the other end of said first cylinder means and pivotally connected to a fixed portion of the towed vehicle on one side of the rotatable portion; second hydraulic cylinder means pivotally connected at one end to the rotatable portion of the turntable means at or near said one end of said first cylinder means; second piston rod means extending out of the other end of said second cylinder means and pivotally connected to a fixed portion of the towed vehicle on a second side of the rotatable portion opposite to said one side thereof; first tube means interconnecting one end of said first and second hydraulic cylinder means; second tube means interconnecting the other end of said first and second hydraulic cylinder means; control means in one said tube means, including a pair of lines for carrying hydraulic liquid between ends of the tube means containing the control means; valve means in one said line for closing said one line; sensor means for sensing the speed of the towed vehicle and for closing said valve means when the speed of the towed vehicle exceeds a predetermined maximum; and first fixed orifice means in the other said line of smaller area than said one line for carrying hydraulic fluid when said valve means is closed, whereby hydraulic fluid normally flows freely between said cylinders to permit free rotation of said rotatable portion of the turntable means and, at trailer travel speeds exceeding the predetermined maximum, the valve means closes said one line, to cause hydraulic liquid to flow through said first restricted orifice means to inhibit turning of said rotatable portion, and consequently of said towed vehicle.

2. A stabilizing device according to claim 1, wherein said one end of second hydraulic cylinder means is pivotally connected to said one end of said first hydraulic cylinder means.

3. A stabilizing device according to claim 2, including second fixed orifice means in said one line of larger area than said first orifice means.

4. A stabilizing device according to claim 3, wherein said first and second fixed orifice means are replaceable with orifice means of different areas to change the degree of stabilizing control of the device.

* * * * *